United States Patent Office 3,211,788
Patented Oct. 12, 1965

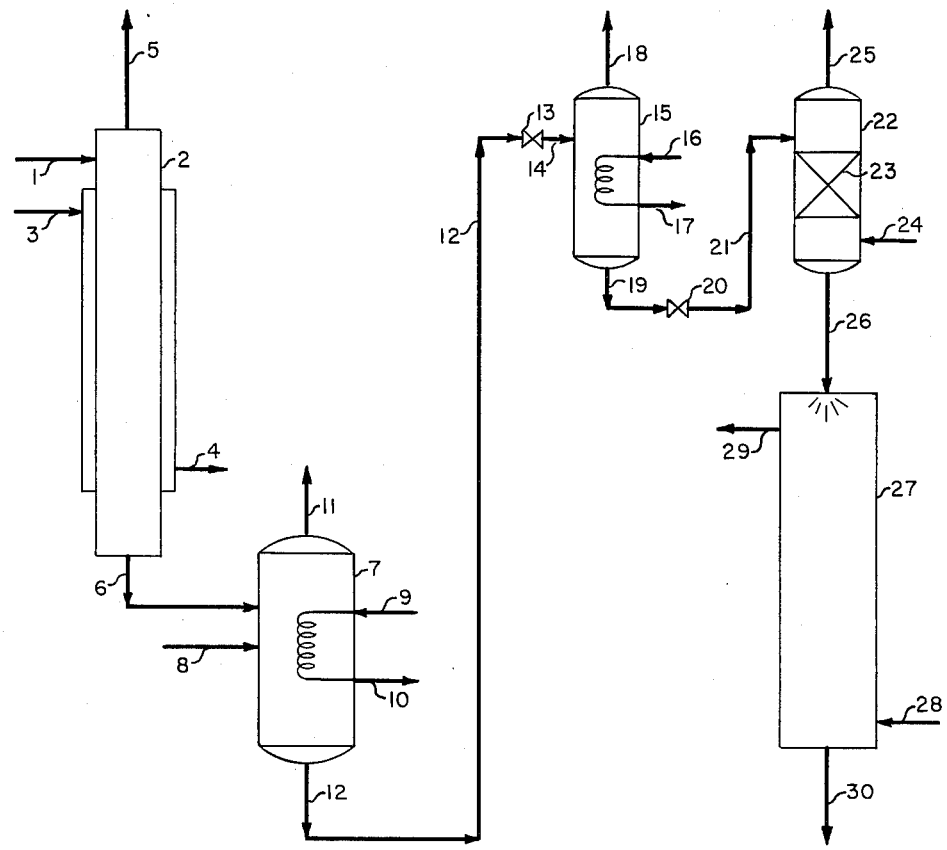
LUCIEN H. COOK
*INVENTOR.*
AGENT

3,211,788
BIURET CONTROL IN UREA PROCESS
Lucien H. Cook, Port Washington, N.Y., assignor to Chemical Construction Corporation, New York, N.Y., a corporation of Delaware
Filed Nov. 14, 1962, Ser. No. 237,522
3 Claims. (Cl. 260—555)

This invention relates to the production of solid urea from anhydrous urea melt. An improved method of processing the urea melt has been developed, which permits retention and transfer of the molten urea without biuret formation. Anhydrous ammonia is employed to form a liquid urea-ammonia solution, which remains liquid at reduced temperatures thus avoiding biuret formation.

Avoidance of biuret formation is one of the major problems in urea synthesis. This problem is especially serious in the handling of molten anhydrous urea. Biuret is a stable compound which is formed by the reaction and combination of two urea molecules, with the release of a molecule of ammonia. The rate of biuret formation is principally a function of temperature, and consequently the heating of urea melt is avoided in practical operations. However, it is often necessary to transfer the urea melt from a synthesis processing unit such as an evaporator to a solidfication unit such as a prilling tower. In this case, the anhydrous melt must be heated in transit, and thus biuret formation becomes a problem. It has been suggested in the prior art to mount the evaporator unit on the top of the prilling tower, and thus immediately transfer the anhydrous urea melt to the prilling operation. However, this approach is objectionable because extra supports are required for the evaporator, as well as extra lines for steam and condensate. Another prior art procedure involves the formation of urea with substantial biuret content, and the subsequent reduction of biuret content by ammoniation for an extended period of time at elevated pressure. This procedure is expensive and involves relatively high capital costs, since equipment must be provided for retaining the melt at elevated pressure for a considerable time interval.

In the present invention, the biuret content of an anhydrous urea melt is maintained at a low level in a novel manner. An anhydrous solution of ammonia and urea is formed, at the point where anhydrous urea melt is formed by evaporation of aqueous urea solution from a synthesis process. The anhydrous ammonia-urea solution remains in the liquid state at a substantially lower temperature than urea alone. This is highly important, because the rate of biuret formation is a direct function of temperature. Above 200 p.s.i.a. pressure, the ammonia-urea solution will remain liquid regardless of temperature. Thus, the ammonia-urea solution may be maintained and transferred to urea utilization at lower temperature levels at which the rate of biuret formation is negligible.

The ammonia-urea solution is now passed to solidification means such as a prilling tower, flaking roll or similar device for transforming anhydrous melt into discrete particles. The pressure of the ammonia-urea solution is reduced, and ammonia is removed as an off-gas. Residual ammonia may be removed by a separate sweep with heated air or in any similar manner. The residual anhydrous urea melt is then immediately passed into the solidification means mentioned supra, and solid urea product having negligible biuret content is formed.

The procedure of the present invention has several noteworthy advantages. Biuret formation in the handling of anhydrous urea melt is controlled and prevented. Urea melt may be handled and transferred at lower temperature levels, without danger of freeze-ups. In addition, residual moisture which may be present in the urea melt is simultaneously removed when the ammonia is removed from the ammonia-urea solution prior to solidification.

It is an object of the present invention to provide a method for handling anhydrous urea melt in an improved manner.

Another object is to control and prevent biuret formation in the processing of anhydrous urea melt.

A further object is to provide a method and means for handling liquid urea at reduced temperatures.

An additional object is to transfer anhydrous urea melt from concentrating means to solidification means without biuret formation.

Still another object is to utilize anhydrous ammonia-urea solution as a means for handling urea melt.

These and other objects and advantages of the present invention will become evident from the description which follows. Referring to the figure, an aqueous urea solution 1 derived from a urea synthesis facility is passed into evaporator 2. Unit 2 is provided with internal means not shown for evaporating water from solution 1, thus unit 2 is typically provided with a steam jacket having steam entry 3 and condensate disposal 4. The water vapor evaporated from stream 1 is removed via 5, which may be connected to a suitable vacuum source. The substantially anhydrous urea melt is removed from unit 2 via 6, at a temperature above 132° C. and a pressure preferably above 200 p.s.i.a. Stream 6 will preferably be at a temperature in the range of 135° C. to 145° C., and will contain at least 99% urea content. Stream 6 is now passed into ammoniator unit 7, together with ammonia feed stream 8. Unit 7 is preferably at a pressure above 200 p.s.i.a., in order to prevent any possibility of freeze-ups due to temperature reduction. A steam coil is also provided in unit 7, with steam passing in via 9 and condensate removal via 10. Most of ammonia stream 8 is dissolved into the urea melt in unit 7, to form an ammonia-urea solution. The balance of undissolved ammonia is removed via 11, while the ammonia-urea solution is removed from unit 7 via 12. Stream 12 will have a lowered melting point due to the presence of the ammonia, thus above the preferable pressure level of 200 p.s.i.a., stream 12 will remain liquid regardless of temperature. It is therefore possible to obtain stream 12 at a temperature below the melting point of pure urea, hence stream 12 will preferably be at a pressure in the range of 200 p.s.i.a. to 300 p.s.i.a. and a temperature in the range of 80° C. to 120° C.

Stream 12 is now passed from the urea concentration section to solidification means, which may be physically located at some considerable distance from the concentration section. Transfer of anhydrous urea melt under such circumstances would result in substantial biuret formation, however the fact that stream 12 consists of an ammonia-urea solution rather than anhydrous urea melt permits such transfer without biuret formation. Stream 12 is thus passed to pressure reducing valve 13. where the solution pressure is reduced to below 50 p.s.i.g. and preferably to the range of 5 p.s.i.g. to 25 p.s.i.g. prior to ammonia removal. The resulting stream 14 at reduced pressure is passed into ammonia stripper 15, which is heated as required by steam admitted to a coil via 16 with condensate removal via 17. Ammonia removed from stream 14 in unit 15 is discharged via 18. Stream 18 will also contain any residual moisture which may have been present in the urea melt. The residual urea solution with only minor ammonia content is removed from unit 15 via 19, and passed via valve 20 to substantially atmospheric pressure.

The resulting stream 21 is now passed to final stripper 22, where residual ammonia is removed to produce an anhydrous and ammonia-free urea melt. Unit 22 is provided with a packed section 23 or other means for gas-liquid contact. Heated air or other stripped gas is passed into unit 22 via 24, and the resulting air-ammonia gas mixture is removed from unit 22 via 25. The resulting residual urea melt consisting of substantially anhydrous and ammonia-free molten urea is removed from unit 22 via 26 and is passed to solidification means. Such means may consist of a prilling tower, flaking roll or other known devices for producing solid urea in the form of discrete particles from a urea melt. A typical prilling tower 27 is shown in the figure. Thus, stream 26 is sprayed into the upper portion of unit 27, while a stream of air is admitted to unit 27 via 28 and passes upward through unit 27 countercurrent to the falling urea. The air stream is removed via 29, while the solid urea prills are removed from unit 27 via 30.

Various modifications or alternatives within the scope of the present invention beside those mentioned supra, will readily occur to those skilled in the art. In all cases it will be apparent that the essence of the present invention resides in the formation of an anhydrous ammonia-urea solution by the addition of ammonia to an anhydrous urea melt. This solution is retained or transported at reduced temperature and without biuret formation, to the point of ultimate utilization such as a prilling tower. Here the ammonia is separated from the urea, leaving a urea melt with substantially no biuret content. The melt is then prilled or solidified by other means, to produce a biuret-free solid urea product.

I claim:

1. Method of controlling biuret concentration in a urea process which comprises concentrating an aqueous solution of synthetic urea to form a substantially anhydrous urea melt at a temperature above 132° C., dissolving ammonia into said urea melt at a pressure above 200 p.s.i.a. whereby a two component urea-ammonia solution is formed at a temperature below 132° C., passing said solution to solidification means for formation of solid urea product, reducing the pressure of said solution below 50 p.s.i.g. and simultaneously heating said solution, whereby a major portion of dissolved ammonia is evolved and removed as an off-gas, passing air through the residual solution to remove the balance of dissolved ammonia as a mixed air-ammonia gas stream, and solidifying the residual urea melt in said solidification means to form a solid urea product substantially free of biuret.

2. Method of claim 1, in which said solidfication means comprises a prilling tower, and said ammonia removal takes place in proximity to the top of said tower.

3. Method of controlling biuret concentration in a urea process which comprises concentrating an aqueous solution of synthetic urea to form a urea melt at a temperature in the range of 135° C. to 145° C., said melt having at least 99% urea content, dissolving ammonia into said urea melt at a pressure in the range of 200 p.s.i.a. to 300 p.s.i.a. whereby a two component urea-ammonia solution is formed at a temperature in the range of 80° C. to 120° C., passing said solution to ammonia removal means disposed at the upper section of a prilling tower, reducing the pressure of said solution to the range of 5 p.s.i.g. to 25 p.s.i.g. and simultaneously heating said solution, whereby a major portion of dissolved ammonia is evolved and removed as an off-gas, passing air through the residual solution at substantially atmospheric pressure to remove the balance of dissolved ammonia as a mixed air-ammonia gas stream, and prilling the residual urea melt in said prilling tower to form solid urea prills substantially free of biuret.

References Cited by the Examiner

UNITED STATES PATENTS 2,854,482  9/58  Guyer _____ 260—555

FOREIGN PATENTS 224,126  4/58  Australia.
95,513   9/60  Holland.

OTHER REFERENCES

Cronan: Chem. Eng., pages 44 to 46 and 48, Jan. 26, 1959.

Redemann et al.: Ind. and Eng. Chem., vol. 50, No. 4 (1958), pages 633–36.

Scholl et al.: Ind. and Eng. Chem., vol. 26 (1934), pages 1299–1301.

NICHOLAS S. RIZZO, *Primary Examiner.*